(12) United States Patent
Pivovarov et al.

(10) Patent No.: US 6,291,010 B1
(45) Date of Patent: Sep. 18, 2001

(54) PROCESS FOR OBTAINING STURGEON CAVIAR ANALOG, AND PRODUCT THUS OBTAINED

(75) Inventors: Pavel Petrovich Pivovarov; Fiodor Vsevolodovich Pertsovoy, both of Jarkov (UA); Rogelio Pozo Carro, Sukarrieta (ES)

(73) Assignee: Transucrania, S.A., San Sebastian (ES)

( * ) Notice: Subject to any disclaimer, the term of this patent is extended or adjusted under 35 U.S.C. 154(b) by 0 days.

(21) Appl. No.: 09/380,808

(22) PCT Filed: Mar. 20, 1997

(86) PCT No.: PCT/ES97/00072

§ 371 Date: Nov. 5, 1999

§ 102(e) Date: Nov. 5, 1999

(87) PCT Pub. No.: WO98/42212

PCT Pub. Date: Oct. 1, 1998

(51) Int. Cl.[7] .................................................. A22C 25/00
(52) U.S. Cl. ............................................. 426/643; 426/641
(58) Field of Search ............................................... 426/643

(56) References Cited

U.S. PATENT DOCUMENTS

| | | | |
|---|---|---|---|
| 4,202,908 | 5/1980 | Nesmeyanov | 426/72 |
| 5,089,277 | * 2/1992 | Prochnow | 426/1 |
| 5,397,590 | * 3/1995 | Scott | 426/589 |
| 5,431,934 | 7/1995 | Vainerman | 426/89 |
| 5,942,266 | * 8/1999 | Okamura | 426/89 |

FOREIGN PATENT DOCUMENTS

| | | |
|---|---|---|
| 2158339 | 11/1985 | (GB) . |
| 55-148072 | * 5/1979 | (JP) . |
| 55-148072 | 11/1980 | (JP) . |
| 57-129676 | 8/1982 | (JP) . |
| 60-075260 | 4/1985 | (JP) . |
| 60-160864 | 8/1985 | (JP) . |
| 2124076 | 5/1990 | (JP) . |
| WO93/06751 | * 4/1993 | (RU) . |
| WO93/07764 | * 4/1993 | (RU) . |

OTHER PUBLICATIONS

English Abstract of JP 60075260.
English Abstract of JP 55148072.
English Abstract of JP 57129676.
English Abstract of JP 60160864.
English Abstract of JP 2124076.

* cited by examiner

*Primary Examiner*—Carolyn Paden

(57) ABSTRACT

This procedure proposes the obtention of a product similar to sturgeon caviar as from a mixture of fish muscle, egg, methylcellulose, cephalopod ink, preservatives and salt, forming an emulsion which is introduced into a granulator in which it is subjected to fluctuations which cause the emulsion to divide into drops in controlled manner, introducing the obtained drops into a configurator liquid medium, generally oil, which is to be found at a temperature between 75 and 94° C., adding to the thus obtained granules, a culinary emulsion made up of fish muscle, spawns and/or fish roes, and a methylcellulose solution. Finally adding vegetable oil and/or fish oil.

7 Claims, No Drawings

PROCESS FOR OBTAINING STURGEON CAVIAR ANALOG, AND PRODUCT THUS OBTAINED

OBJECT OF THE INVENTION

The procedure which is the object of the invention is applicable to food industry and is intended for the obtention of a granulated product which imitates in its organoleptic characteristics, structure and consistency, sturgeon caviar.

BACKGROUND OF THE INVENTION

At present in the Market, diverse products are commercialized as substitutes or imitations of caviar, the most widespread of them being succedaneous caviar, which is constituted by spawn from fish other than sturgeon, such as lumpo spawn.

Another type of product is the similar or like product to caviar, which is not formed by fish spawn, but which is obtained by means of an industrial procedure as from diverse components.

In this sense, Patent PCT No. WO 93/06751 can be quoted, in relation to a food product of the caviar type and the procedure for its production. In this patent, granules are obtained which are made up by an exterior layer of egg whites and an interior layer of a viscous emulsion, the granules obtained containing from 13 to 30% of albumin and between 45 and 71% fat. The obtention procedure of these granules consist in the introduction of the viscous emulsion obtained, in the form of drops, into a hot vegetable, edible, oil mass, at a temperature comprised between 80 and 85° C.

Likewise, Patent PCT No. WO 93/07764 describes the obtention of a food product which is similar to caviar, constituted by granules formed as from egg white, in a percentage between 8 and 35%, egg yolk, with a percentage between 35 and 80%, a fat component, in a percentage between 10 and 20%, and finally, a food colouring agent with a percentage between 0,05 and 0,15%. According to the obtention method of the granules described in this Patent, a viscous emulsion is prepared as from the egg white, egg yolk, fat component and food colouring agent and it is introduced in the form of drops, into vegetable oil heated up to a temperature of 75 to 85° C.

DESCRIPTION OF THE INVENTION

The procedure of the invention, permits the obtention of a granulated product of great similarity to sturgeon caviar, both as regards its external appearance (shape, colour and appearance) and its taste, texture and consistency, made as from egg, fish muscle, spawn and fish roe, mainly of species of fish which are little used commercially such as mackerel, starling, or saurel (scomber sp. and tachurus sp.).

The contents of fish muscle present in the granules is of 40–55%, whilst the contents of egg is limited to 43–58%, so that the percentage of protein ingredients is always over 55%.

Likewise, the procedure which is the object of the invention includes as main raw material, methylcellulose, in a percentage between 0,2 and 2%, in mass of the obtained granules. The methylcellulose mixed with the egg potentiates the gellification capacity of the same, reducing the temperature at which the gellification of the egg is produced, in such a manner, that it is possible to adjust the consistency of the obtained granule by varying the temperature or the concentration of the methylcellulose which is present. Additionally, the methylcellulose, when cooled passes on to dissolved condition, providing the obtained granules with a smoother consistency or texture, forming a binder medium with identical organoleptic conditions to that of the caviar.

Consequently, the methylcellulose constitutes a fundamental component in the process for the obtention of the granules since it permits the obtention of granules with high mechanical strength, capable of supporting the mechanical and hydromechanical action, whilst when it cools, it provides a very smooth consistency.

Thus, the method of the invention includes the formation of granules as from a mass of proteins constituted by fish muscle and eggs, to which a methylcellulose solution is added as texturizer, cephalopod ink as colouring agent, salt and preservatives For this, a mixture is prepared which is made up of a fish homogenized product, a preparation of non water bird eggs, a solution of methylcellulose as texturizer, a natural colouring agent, preservatives and salt.

These components are crumbled in a set order inside a homegenator machine and the thus obtained mixture is deaerated, filtered and centrifuged in order to eliminate the badly grounded fractions, subsequently passing on to a granulator device.

In the granulator, the homogenized mixture is subjected to fluctuations which produce symmetrical deformations to the axis of the liquid mass jet to be configurated, causing the jet to be divided into drops in a controlled manner. The obtained drops fall into a liquid medium, generally oil, which is to be found at a temperature between 75 and 94° C., producing the coagulation of the proteins and the formation of the granules.

Finally, the obtained granules are treated with a culinary emulsion prepared as from a fish homogenate made up of roe spawn and fish muscle in a percentage of 50 to 55%, a 14 to 16% of vegetable oil, a 0,3 to 0,5% of the methylcellulose solution, 0,6 to 1% of cephalopod ink, 2 to 4% of salt and 15 to 22% of water.

In this manner, a product similar to caviar is obtained formed by 75 to 90% weight of granules, a 10 to 25% of culinary emulsion and a 1 to 3% of fish or vegetable oil, the granules having been prepared as from a 40 to 55% of fish homogenate product formed by muscle, roes or fish spawn, of 43 to 58% of egg, a 0,2 to 2% of methylcellulose solution, a 2 to 4% of salt and a 1 to 3% of cephalopod ink, whilst the culinary emulsion has been prepared as from a fish homogenate in a percentage of 50 to 55%, a 14 to 16% of vegetable oil, a 0,3 to 0,5% of methylcellulose, solution 0,6 to 1% of cephalopod ink, 2 to 4% salt and 15 to 22% water.

DETAILED DESCRIPTION OF THE INVENTION

The procedure for the obtention of a product similar to sturgeon caviar which is proposed, permits the obtention of a granular product which is structurally and organoleptically identical to caviar, with a percentage of proteinic ingredients between 55 and 98%, as from the following raw materials:

Mackerel, starling, white saurel, black saurel or the like, fresh, frozen or salted.

Spawn and roes of said species of fish

Non water bird eggs (whole, liquid or in powder form).

Water soluble methylcellulose

Cephalopod ink

Potassium sorbate

Sodium benzoate

Common salt

Sunflower oil, olive oil and cod liver oil.

The technological process for the obtention of a product similar to caviar consists of the following phases:

Preparation of the protein homogenate

Preparation of the methylcellulose solution

Preparation of the egg protein

Preparation of the mixture for the granulation

Formation of the granules

Preparation of the culinary emulsion

Final preparation of the product similar to caviar

Packaging and pasteurization.

Preparation of the protein homogenate

The preparation process of the fish homogenates includes the preparation and transformation of the different types of raw material or their mixture in a homogeneous mass.

The fish roes and fish spawn, previously salted, are washed with jets of water and the inclusion are eliminated, subsequently passing them through a grinding apparatus.

The viscera of the fish are removed, cut into butterflies and salted with dry salt, in a weight proportion of 15% for 24 h. The spawns and roes are salted in like manner during the same period of time and are stored in the refrigerator at 2±2° C. Subsequently, the fish is cut into fillets with skin and without fish bones, passing them through a fine grinding apparatus.

Preparation of the methylcellulose solution

Boiling water is added to the methylcellulose and left to dwell during more than 4 h at room temperature.

Preparation of the egg protein

Firstly, the intact eggs are washed and hygiened by immersion in a disinfectant solution. The yolks or egg mixture is passed through a centrifugator-filter or fine grinding apparatus, subsequently degassing.

When using dehydrated eggs, the eggs are screened through a sieve into a container, adding cold water in a proportion of 1 part egg per every 3,5 parts of water.

Next, they are mixed and 10 gr of common salt are added per every Kilogramme of mixture obtained, leaving to dwell from 30 to 40 minutes.

Preparation of the mixture for the granulation

Introduce in the homogenator a tenth part of the mixture of egg to be added, add the fish homogenate, mixing well until a homogeneous mass is obtained. Whilst it is mixing the mass obtained, add the methylcellulose, the salt, the remaining part of the egg preparation, the colouring agent and the preservatives (sodium benzoate, potassium sorbate). The colouring agent is constituted by a uniform mass obtained as from the cephalopod ink. The order of addition of said ingredients may be different depending on the type of homogenator used.

Next, the obtained homogenate is filtered degassed and passed on to the granular phase.

During the preparation and mixing process, the temperature of the prepared mixture shall be maintained at 25±5° C., the viscosity of the mixture being for the granulation from 140 to 270 cPa.

The formulas related to the preparation of the mixture are shown in table 1.

Formation of the granules

The formation of the granules is produced in a granulator constituted by a food container for the mixture, an actual granulator and an oil tank.

The previously obtained mixture which is to be found in the container or food channel of the granulator is subjected to the action of fluctuation which produce symmetrical deformations to the jet of the liquid mass to be configurated, causing it to be divided into drops in a controlled manner. The drops obtained form small spheres which fall into a configurating liquid medium, generally oil, at a temperature comprised between 75 and 94° C., producing the coagulation of the proteins and in consequence, the formation of the resistant granules.

The configurated granules pass through a centrifuge or sieve where they are separated from the oil and subsequently passed on to a device to be washed with water.

A mixture of oil and water in proportions 1:1 may be used as configurator liquid.

Preparation of the culinary emulsion

The culinary emulsion is prepared by means of grinding the fish homogenates with the components provided in the formulas of table 2.

Next, the water and the fish homogenates are introduced into the apparatus for its fine grinding and filtered, adding to the filtered product, whilst continuously mixing, salt, potassium sorbate, sodium benzoate, the methylcellulose solution and, finally, the colouring agent.

Final preparation of the similar product to sturgeon caviar

Add the culinary emulsion and the fish oil or vegetable oil to the obtained granules, mixing well and proceed to its packaging.

This mixture is made in such proportions that the caviar product obtained contains between 75 and 90% of granules, 10 to 25% of emulsion and from 1 to 3% of fish or vegetable oil.

Packaging and pasteurization

The product similar to caviar obtained, is packed in metallic tins or in closed and sealed glass jars and pasteurized by means of heating up to 75±2° C. for the tins and up to 80±2° C. for the jars.

TABLE 1

Formulas for the preparation of the mixture for granulation, in kg per every 100 kg of final product

| Name of the components | Formulas | | | | | | | | |
|---|---|---|---|---|---|---|---|---|---|
| | 1 | 2 | 3 | 4 | 5 | 6 | 7 | 8 | 9 |
| Yolks, mixture of egg or dehydrated egg and reestablished | 98.0 | 68.3 | 64.2 | 62.9 | 88.1 | 88.1 | 88.1 | 88.1 | 88.1 |
| Satt | 1.1 | 2.2 | 5.0 | 3.9 | 2.8 | 2.8 | 2.8 | 2.8 | 2.8 |
| Colouring agent | 5.0 | 4.8 | 5.9 | 5.5 | 7.1 | 7.1 | 7.1 | 7.1 | 7.1 |
| Methyl cellulose solution | — | — | — | — | 3.9 | 3.9 | 3.9 | 3.9 | 3.9 |
| Fish homogenate based on: | | | | 33.3 | | | 9.4 | | |
| Salmon roes | | | | | | 9.4 | | | |
| Kipper roes | | | 5.4 | | | | | | |
| Salted spawns | | | | | | | | 9.4 | |
| Frozen spawns | | 27.8 | | | | | | | |
| Kippers or other salty fish | | | | | 9.4 | | | | |
| Cod liver | | | | | | | | | 9.4 |

Note:
The masses of the ingredients are calculated considering the losses during the preparation process of the mixture, filtering and granulation, and its levels ascend to a 19.7%. The permitted deviations in mass in the weighing of the components are of 2%.

TABLE 2

Formulas of the culinary emulsions in kg per 100 kg of final product

| Name of ingredients | Formulas | | | |
|---|---|---|---|---|
| | 1 | 2 | 3 | 4 |
| Fish homogenate based on: | | | | |
| Salmon roes | 4.7 | | | |
| Kipper roes | 4.3 | | | |
| Salted spawn | | | 7.2 | |
| Salted kippers | | 5.5 | | |
| Fish liver | | | | 6.5 |
| Water | 1.9 | 5.0 | 3.7 | 3.2 |
| Salt | 1.9 | 1.9 | 1.9 | 1.9 |
| Methylcellulose solution of 10% | | 0.4 | | 1.2 |
| Colouring agent | 0.3 | 0.3 | 0.3 | 0.3 |

What is claimed is:

1. A procedure for obtaining a product similar to sturgeon caviar, comprising:

crumbling, grinding and salting fish muscle, mixing the crumbled, ground and salted fish muscle in an homogenator with egg protein and methylcellulose, a cephalopod ink, preservatives and salt at a temperature of 25±5° C. to obtain an homogenate, filtering and degassing the homogenate, transversely dividing a jet of the filtered and degassed homogenate into drops, introducing the drops into a liquid at a temperature between 75 and 94° C. for promoting granulation of the drops into granules having a content of protein of 55–98%; and adding to the granules a culinary emulsion and vegetable oil and/or fish oil sufficient to make the granules into the product similar to sturgeon caviar.

2. The procedure according to claim 1, further comprising obtaining the culinary emulsion by grinding and filtering fish muscle, spawn and/or fish roes and adding a methylcellulose solution, colouring agent and salt.

3. The procedure according to claim 2, wherein the crumbling, grinding and salting of the fish muscle further comprises crumbling, grinding and salting spawns and/or fish roes therewith.

4. The product obtained according to claim 3, comprising 75 to 90% by weight of the granules, 10 to 25% of the culinary emulsion and 1 to 3% of the fish or vegetable oil, wherein the granules are 40 to 55% of the fish muscle, fish roes, or spawns, 43 to 58% of the egg protein, 0.2 to 2% of the methylcellulose, 2 to 4% of the salt and 1 to 3% of the cephalopod ink, and wherein the culinary emulsion is 50 to 55% fish homogenate, 14 to 16% vegetable oil, 0.3 to 0.5% methylcellulose, 0.6 to 1% cephalopod ink, 2 to 4% salt, and 15 to 22% water.

5. The procedure according to claim 1, wherein the crumbling, grinding and salting of the fish muscle further comprises crumbling, grinding and salting spawns and/or fish roes therewith.

6. The product obtained according to claim 5, comprising 75 to 90% by weight of the granules, 10 to 25% of the culinary emulsion and 1 to 3% of the fish or vegetable oil, wherein the granules are 40 to 55% of the fish muscle, fish roes, or spawns, 43 to 58% of the egg protein, 0.2 to 2% of the methylcellulose, 2 to 4% of the salt and 1 to 3% of the cephalopod ink, and wherein the culinary emulsion is 50 to 55% fish homogenate, 14 to 16% vegetable oil, 0.3 to 0.5% methylcellulose, 0.6 to 1% cephalopod ink, 2 to 4% salt, and 15 to 22% water.

7. A product similar to caviar, comprising 75 to 90% by weight of granules, 10 to 25% of culinary emulsion and 1 to 3% of fish or vegetable oil, wherein the granules are 40 to 55% of an homogenate of fish muscle, roes, or fish spawn, 43 to 58% egg, 0.2 to 2% methylcellulose, 2 to 4% salt and 1 to 3% cephalopod ink, and wherein the culinary emulsion is 50 to 55% fish homogenate, 14 to 16% vegetable oil, 0.3 to 0.5% methylcellulose, 0.6 to 1% cephalopod ink, 2 to 4% salt, and 15 to 22% water.

* * * * *

UNITED STATES PATENT AND TRADEMARK OFFICE
CERTIFICATE OF CORRECTION

PATENT NO.    : 6,291,010 B1                                      Page 1 of 1
DATED         : September 18, 2001
INVENTOR(S)   : Pavel Petrovich Pivovarov et al.

It is certified that error appears in the above-identified patent and that said Letters Patent is hereby corrected as shown below:

<u>Title page,</u>
Item [75], after "(ES)" insert -- Irene Garcia Palacios, Usurbil (ES) --.

Signed and Sealed this

Twenty-second Day of October, 2002

Attest:

Attesting Officer

JAMES E. ROGAN
*Director of the United States Patent and Trademark Office*